(12) United States Patent
Weinberg et al.

(10) Patent No.: US 9,799,050 B2
(45) Date of Patent: *Oct. 24, 2017

(54) CONTROLLING CONTENT DISTRIBUTION

(71) Applicant: Google Inc., Mountain View, CA (US)

(72) Inventors: Aitan Weinberg, Brooklyn, NY (US);
Rajas Moonka, San Ramon, CA (US);
Brad H. Bender, New York, NY (US);
Brian Axe, Portola Valley, CA (US);
Oren E. Zamir, Los Altos, CA (US);
Gregor Hochmuth, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/187,055

(22) Filed: Jun. 20, 2016

(65) Prior Publication Data
US 2016/0307230 A1 Oct. 20, 2016

Related U.S. Application Data

(63) Continuation of application No. 13/523,436, filed on Jun. 14, 2012, now Pat. No. 9,396,458, which is a
(Continued)

(51) Int. Cl.
*G06Q 30/02* (2012.01)
*G06F 17/30* (2006.01)
(Continued)

(52) U.S. Cl.
CPC ... *G06Q 30/0255* (2013.01); *G06F 17/30867* (2013.01); *G06Q 10/10* (2013.01);
(Continued)

(58) Field of Classification Search
CPC ............... G06Q 30/02; G06Q 30/0251; G06Q 30/0255; G06Q 30/0269; G06Q 30/0277;
(Continued)

(56) References Cited

U.S. PATENT DOCUMENTS 5,724,521 A 3/1998 Dedrick
5,740,549 A 4/1998 Reilly et al.
(Continued)

FOREIGN PATENT DOCUMENTS

EP 0749081 12/1996
JP 2008-028893 2/2008
(Continued)

OTHER PUBLICATIONS

'BluKai Says Transparency for Everyone' [online], Steve Smith, MediaPost Blogs Sep. 19, 2008, [retrieved on May 12, 2009]. Retrieved from: http://www.mediapost.com/publications.index.cfm?fa=articles.showarticle&art_aid=91052.
(Continued)

*Primary Examiner* — David Lazaro
*Assistant Examiner* — Robert Shaw
(74) *Attorney, Agent, or Firm* — Fish & Richardson P.C.

(57) ABSTRACT

A computer-implemented method for controlling content distribution includes forwarding information associated with a user to a device operated by the user, the information being configured for use in selecting content from any of multiple content providers for a content distribution to the user. The method includes receiving, in response to the information, an edit of the information forwarded from the device. The edit identifies a first content provider and including a first modification of the content distribution regarding the first content provider. The method includes storing the edit in association with the information such that the first modification is taken into account in the content distribution. The method can be implemented using a computer program product tangibly embodied in a computer-readable storage medium.

13 Claims, 4 Drawing Sheets

Related U.S. Application Data continuation of application No. 12/401,426, filed on Mar. 10, 2009, now Pat. No. 8,219,638.

(60) Provisional application No. 61/122,597, filed on Dec. 15, 2008.

(51) Int. Cl.
*H04L 29/08* (2006.01)
*G06Q 10/10* (2012.01)

(52) U.S. Cl.
CPC ......... *G06Q 30/02* (2013.01); *G06Q 30/0251* (2013.01); *G06Q 30/0269* (2013.01); *G06Q 30/0277* (2013.01); *H04L 67/22* (2013.01); *H04L 67/306* (2013.01); *G06F 17/30699* (2013.01); *H04L 67/02* (2013.01); *H04L 67/20* (2013.01)

(58) Field of Classification Search
CPC ......... G06F 17/30699; G06F 17/30867; H04L 67/02; H04L 67/20; H04L 67/22; H04L 67/306
See application file for complete search history.

(56) References Cited

U.S. PATENT DOCUMENTS

| | | |
|---|---|---|
| 5,848,397 A | 12/1998 | Marsh et al. |
| 5,948,061 A | 9/1999 | Merriman |
| 6,026,368 A | 2/2000 | Brown et al. |
| 6,044,376 A | 3/2000 | Kurtzman, II |
| 6,078,914 A | 6/2000 | Redfern |
| 6,144,944 A | 11/2000 | Kurtzman, II et al. |
| 6,167,382 A | 12/2000 | Sparks et al. |
| 6,269,361 B1 | 7/2001 | Davis et al. |
| 6,401,075 B1 | 6/2002 | Mason et al. |
| 6,985,882 B1 | 1/2006 | Del Sesto |
| 7,039,599 B2 | 5/2006 | Merriman |
| 7,136,875 B2 | 11/2006 | Anderson et al. |
| 7,860,859 B2 | 12/2010 | Haugen et al. |
| 7,966,395 B1* | 6/2011 | Pope ................. G06F 17/30867 709/224 |
| 8,103,506 B1* | 1/2012 | Meyer .................... G06F 17/27 704/237 |
| 8,131,594 B1* | 3/2012 | Yehoshua ............. G06Q 30/02 705/14.53 |
| 8,386,509 B1* | 2/2013 | Scofield ............ G06F 17/30699 707/706 |
| 9,137,093 B1* | 9/2015 | Abraham .......... H04L 29/12009 |
| 2002/0026349 A1 | 2/2002 | Reilly et al. |
| 2002/0046147 A1* | 4/2002 | Livesay ................. G06Q 10/06 705/37 |
| 2002/0065718 A1 | 5/2002 | Otani et al. |
| 2002/0069105 A1* | 6/2002 | do Rosario Botelho ............ G06F 17/30867 705/14.53 |
| 2002/0077930 A1* | 6/2002 | Trubey ................... G06Q 30/02 705/27.2 |
| 2002/0111897 A1* | 8/2002 | Davis ................. G06Q 10/087 705/37 |
| 2002/0194151 A1* | 12/2002 | Fenton ................. G06F 17/3089 |
| 2005/0149410 A1* | 7/2005 | Livesay ................. G06Q 10/06 705/26.8 |
| 2006/0129445 A1* | 6/2006 | McCallum ............. G06Q 10/10 705/7.18 |
| 2007/0050711 A1* | 3/2007 | Walker .............. G06F 17/30855 715/205 |
| 2007/0118803 A1* | 5/2007 | Walker .............. G06F 17/30855 715/744 |
| 2007/0179841 A1 | 8/2007 | Agassi et al. |
| 2007/0239676 A1* | 10/2007 | Stonehocker ......... G06F 3/0482 |
| 2008/0027807 A1* | 1/2008 | Matsumoto ............ G06Q 30/02 705/14.41 |
| 2008/0040216 A1* | 2/2008 | Dellovo .............. G06Q 10/0637 705/14.44 |
| 2008/0040221 A1* | 2/2008 | Wiseman ............... G06Q 30/02 705/14.54 |
| 2008/0114639 A1* | 5/2008 | Meek ..................... G06Q 30/02 705/14.41 |
| 2008/0140476 A1 | 6/2008 | Anand et al. |
| 2008/0228571 A1* | 9/2008 | Koran .................... G06Q 30/02 705/14.43 |
| 2008/0235085 A1 | 9/2008 | Kovinsky et al. |
| 2008/0243780 A1* | 10/2008 | Nance ............ G06F 17/30699 |
| 2008/0281711 A1* | 11/2008 | Bridges ................ G06Q 30/02 705/14.27 |
| 2008/0294523 A1* | 11/2008 | Little ..................... G06Q 30/02 705/14.53 |
| 2008/0028893 A1 | 12/2008 | Segal et al. |
| 2008/0301093 A1 | 12/2008 | Haugen et al. |
| 2009/0006190 A1* | 1/2009 | Lucash .................. G06Q 30/02 705/14.71 |
| 2009/0019148 A1 | 1/2009 | Britton et al. |
| 2009/0024700 A1* | 1/2009 | Garg ...................... G06Q 30/02 709/203 |
| 2009/0094093 A1 | 4/2009 | Phan |
| 2009/0203387 A1* | 8/2009 | Wold ..................... G06Q 30/02 455/456.3 |
| 2009/0210391 A1* | 8/2009 | Hall .................. G06F 17/30867 |
| 2009/0234738 A1 | 9/2009 | Britton et al. |
| 2009/0259540 A1 | 10/2009 | Phan |
| 2009/0287566 A1* | 11/2009 | McAfee ............. G06Q 30/0242 705/14.41 |
| 2009/0327488 A1 | 12/2009 | Sampat et al. |
| 2010/0023392 A1 | 1/2010 | Merriman et al. |
| 2010/0070339 A1 | 3/2010 | Bae et al. |
| 2010/0076846 A1* | 3/2010 | Pfeiffer .............. G06Q 30/0255 705/14.53 |
| 2010/0211464 A1* | 8/2010 | Zhu .................... G06Q 30/0255 705/14.53 |
| 2010/0274815 A1 | 10/2010 | Vanasco |

FOREIGN PATENT DOCUMENTS

| | | |
|---|---|---|
| KR | 10-2002-0040958 | 5/2002 |
| KR | 10-2005-0048224 | 5/2005 |
| WO | 97/21183 | 6/1997 |
| WO | 01/40920 | 6/2001 |
| WO | 2008/121993 | 10/2008 |

OTHER PUBLICATIONS

95/001,061, Reexamination of Stone et al.
95/001,068, Reexamination of Stone et al.
95/001,069, Reexamination of Dean et al.
95/001,073, Reexamination of Stone et al.
MSN homepage [online], MSN, [published Oct. 1, 2007], [retrieved on May 12, 2009]. Retrieved from: http://web.archive.org/web/20071001173359/http://www.msn.com/.
'About Facebook' [online], Facebook, [published on Oct. 12, 2007], [retrieved on May 12, 2009]. Retrieved from: http://web.archive.org/web/20071012215730/www.facebook.com/about.php.
'Google Checkout Privacy Policy' [online], Google Checkout [published on Apr. 12, 2007], [retrieved on May 12, 2009]. Retrieved from: https://checkout.google.com/files/privacy/archive/20070412_buyer.html.
International Search Report and Written Opinion for Application No. PCT/US2009/067998, dated Feb. 22, 2011, 10 pages.
International Preliminary Report on Patentability for Application No. PCT/US2009/067998, dated Jun. 21, 2011, 7 pages.
Extended European Search Report issued in European Application No. 09799805.8, dated Jun. 14, 2017, 8 pages.

* cited by examiner

CONTROLLING CONTENT DISTRIBUTION

CROSS-REFERENCE TO RELATED APPLICATIONS

This application is a continuation of and claims priority under 35 U.S.C. §120 to U.S. application Ser. No. 13/523,436, filed on Jun. 14, 2012, which is a continuation of and claims priority to U.S. application Ser. No. 12/401,426, filed on Mar. 10, 2009, which claims priority to U.S. Provisional Application Ser. No. 61/122,597, filed on Dec. 15, 2008, the entire contents of which are hereby incorporated by reference.

TECHNICAL FIELD

This document relates to information processing.

BACKGROUND

The World Wide Web is a system of interlinked documents, or web pages, accessible through the Internet. Generally, web pages can be accessed by a client device running a browser application. A Web cookie containing text information can be sent by a web page server to a browser accessing the web page and the cookie can be sent back each time the browser accesses the web page. Some web page owners and other publishers include advertising content on their pages.

SUMMARY

In a first aspect, a computer-implemented method for controlling content distribution includes forwarding information associated with a user to a device operated by the user, the information being configured for use in selecting content from any of multiple content providers for a content distribution to the user. The method includes receiving, in response to the information, an edit of the information forwarded from the device. The edit identifies a first content provider and including a first modification of the content distribution regarding the first content provider. The method includes storing the edit in association with the information such that the first modification is taken into account in the content distribution. The method can be implemented using a computer program product tangibly embodied in a computer-readable storage medium.

Implementations can include any, all or none of the following features. The content distribution can take place under an arrangement where the content providers provide advertising content for publication in connection with content from any of a plurality of publishers, the plurality of publishers can receive compensation from the content providers in return for publication, and the edit can permit the user to exercise control over which of the advertising content is included in the content distribution. The information can further identify at least one interest that has been associated with the user for selecting the content for the content distribution, the edit can further include a second modification of the content distribution regarding the interest, and the edit can be stored such that the second modification also is taken into account in the content distribution. The first modification can include altering the plurality of content providers to add or delete the first content provider; and the second modification can include altering the content distribution to add or delete the interest as being associated with the user. The edit can further include a user-defined modification of the content distribution regarding an interest, and the edit can be stored such that the user-defined modification also is taken into account in the content distribution.

The first content provider may have retargeted the user in response to the user accessing content associated with the first content provider, and the information can identify the first content provider to the user as having retargeted the user. The edit can specify that the first content provider is to be blocked from retargeting the user but that the first content provider can provide content to the user in the content distribution based on the information taking into account the first modification. The edit can further include a user preference specification regarding the content distribution, and the edit can be stored such that the user preference specification also is taken into account in the content distribution. The user preference specification can define that the user prefers at least one of a text format and a graphic format for the content distribution.

The user preference specification can define that the user prefers at least one of multiple attributes for the content distribution. The method can further include receiving a user identifier associated with the user and accessible on the device for any of the multiple content providers to obtain the information for selecting the content for the content distribution. The user identifier can be forwarded from the device to obtain the information, and the information can be forwarded to the device in response to receiving the user identifier. The method can further include providing to the device executable instructions for execution on the device, and the information can be forwarded to the device in response to receiving a request for the information from the device. The request can be generated using the executable instructions, and the executable instructions can be configured for the user to define the edit to be forwarded. The device can have stored thereon a cookie including an identifier associated with the user, and wherein the executable instructions are configured for generating a cookie viewer application on the device. The cookie can include essentially only the user identifier.

The method can further include identifying a predetermined number of content portions as having been most recently presented to the user in the content distribution; causing at least part of each of the predetermined number of content portions to again be presented on the device; and receiving an input generated by the user from the device, the input identifying at least one of the content portions and including another edit of the information regarding the identified content portion. The other edit can include that the identified content portion is to be blocked from being presented on the device. The method can further include causing at least part of the information to be presented on the device, wherein the first content provider is referred to as anonymous in the presented information.

In a second aspect, a graphical user interface for controlling content distribution includes an information edit area generated on a device for a user to specify an edit of information configured for use in selecting content from any of multiple content providers for a content distribution to the user. The edit identifies a first content provider and includes a first modification of the content distribution regarding the first content provider. The graphical user interface causes the edit to be stored in association with the information such that the first modification is taken into account in the content distribution.

Implementations can include any, all or none of the following features. A predetermined number of content portions can be identified as having been most recently presented to the user in the content distribution and the graphical user interface can cause at least part of each of the predetermined number of content portions to again be presented on the device, and receive an input generated by the user identifying at least one of the content portions and including another edit of the information regarding the identified content portion. The device can have stored thereon a cookie including an identifier associated with the user, and the graphical user interface can include a cookie viewer application configured for generating a request for the information from the device and defining the edit.

In a third aspect, a computer-implemented method for controlling content distribution includes presenting information associated with a user on a device operated by the user, the information received from another device and being configured for use in selecting content from any of multiple content providers for a content distribution to the user. The method includes registering an edit of the information made by the user, the edit identifying a first content provider and including a first modification of the content distribution regarding the first content provider. The method includes forwarding the edit to the other device such that the first modification is taken into account in the content distribution. The method can be implemented using a computer program product tangibly embodied in a computer-readable storage medium.

Implementations can include any, all or none of the following features. The information can further identify at least one interest that has been associated with the user for selecting the content for the content distribution, the edit can further include a second modification of the content distribution regarding the interest, and the edit can be stored such that the second modification also is taken into account in the content distribution. The first content provider may have retargeted the user in response to the user accessing content associated with the first content provider, and the information can identify the first content provider to the user as having retargeted the user. The method can further include presenting each of a predetermined number of content portions on the device, the predetermined number of content portions being identified as having been most recently presented to the user in the content distribution; and registering that the user identifies at least one of the content portions, wherein the edit includes another edit of the information regarding the identified content portion. The other edit can include that the identified content portion is to be blocked from being presented on the device. The method can further include receiving at the device executable instructions for execution, the device may have stored thereon a cookie including an identifier associated with the user and the executable instructions can be configured for generating a cookie viewer application on the device, the cookie viewer application configured for requesting the information from the other device and for registering the edit to be forwarded.

Implementations can provide any, all or none of the following advantages. User control over content distribution can be improved. A cookie viewer application can be provided for a user to view and/or edit registered information that is used for selecting content for distribution. Improved user-targeted content distribution can be provided.

The details of one or more implementations are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

Figure 1:
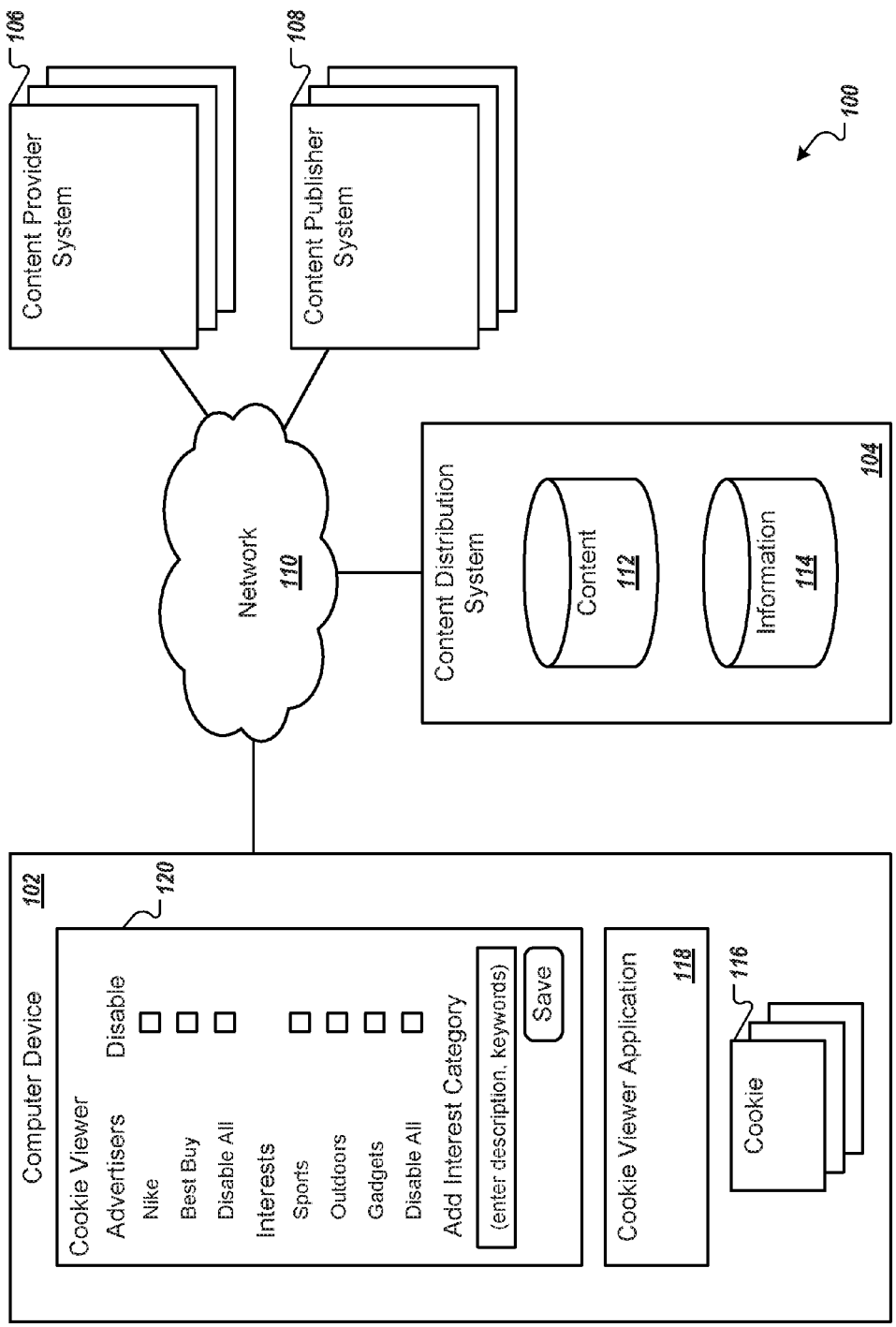
FIG. 1 shows an example of a system for controlling content distribution.

FIG. 1 is a schematic diagram of an example of a computer system 100 that in some implementations can be used for controlling content distribution. Content, such as Internet advertising content or any other form of media, can be created by one or more content providers (advertisers, for example), and presented to one or more users of the system 100 by a content publisher (one or more website owners, for example). In some implementations, the computer system 100 can provide information and control to a user regarding the type and/or the source of presented content, for example.

The system 100 in this example includes a computer device 102, one or more content distribution systems 104, one or more content provider systems 106, and one or more content publisher systems 108, here connected by a network 110. Any kind of computer devices can be used including, but not limited to, personal computers, handheld devices such as cellular phones, and/or server devices. Components in the system 100 can be connected by any kind of network, such as a private network or the Internet. For example, the computer device 102 can be operated by an individual who accesses resources in a network, for example web pages on the Internet.

The content provider system 106 can, for example, be operated by one or more content providers. The content providers can provide content such as advertisements intended for presentation to the user(s) on the computer device 102, for example. Content can include any kind of media, such as elements of text, video, animation, sound, and/or interactive components, to name a few possibilities. Elements of content can be tailored for a specific user, based on defined user interests and preferences, for example. For example, a shoe company can designate a shoe advertisement intended for presentation to the general public and a separate shoe advertisement intended for targeted presentation to any or all users with an interest in the outdoors.

User interest data can be compiled by a variety of methods, including self-reporting by users, and user registration and/or patronage of resources such as websites associated with particular advertisers or interests, to name a few possibilities. Procedures can be put in place to protect user privacy, such as through the provision of a user privacy policy, and/or to allow a user to opt out of information-sharing systems. The content publisher system 108 can, for example, be operated by one or more content publishers. The content publisher(s) can provide content such as websites or any other kind of media to be accessed by a user of the computer device 102, for example. The content publisher can present information and content such as text, video, sound, and games (to name a few possibilities) to visitors of the sites. Additionally, the content publishers can present content (such as advertising content, for example) from content providers. For example, the content distribution can take place under an arrangement where content providers provide content such as advertising for publication in connection with content from one or more publishers, and the publishers receive compensation in return for publication.

The content distribution system 104 can, for example, serve a coordinating role in determining which content provided by one or more content providers to make available in connection with one or more content publishers. The content distribution system 104 in this example includes a content database 112 and an information database 114. Here, for example, information regarding advertising content from a content provider can be sent from the content provider system 106 to the content distribution system 104 via the network 110 and stored in the content database 112. In some implementations, information regarding a device user can be collected by methods including the previously described exemplary methods and stored in the information database 114, for example. In the present example, information regarding a device user can be retrieved from the information database 114 and used by the content distribution system 104 to determine which advertising content can be made available in connection with a web page provided by a content publisher associated with the content publisher system 108.

The computer device 102 in this example includes at least one cookie 116, a cookie viewer application 118, and a cookie viewer interface 120. Each user of the device 102 can be associated with one or more cookies, for example. The computer device 102 can, for example, be controlled by a user to access a web page on the Internet. In the present example, the cookie 116 can be placed on the computer device 102 by a server device associated with the content publisher system 108 via the network 110. The placement of the cookie 116 may be, for example, in temporal connection with the user visiting a page or other content provided by the server. Here, for example, the computer device 102 can store the cookie 116 including an identifier associated with the user. In some implementations, the cookie 116 can include essentially only a user identifier. For example, a user identifier associated with a user and accessible on the device 102 can be received by the content distribution system 104 for one or more content providers to obtain information for selecting the content for content distribution. Here, for example, a user identifier can be forwarded from the device 102 to obtain the information, and the information can be forwarded to the device 102 in response to receiving the user identifier.

In the present example, the cookie viewer application 118 can be a computer program product tangibly embodied in a computer-readable storage medium. The cookie viewer application can include instructions that, when executed, generate on a display device associated with the computer device 102 a graphical user interface for controlling content distribution, for example the cookie viewer interface 120.

In some implementations, the cookie viewer application 118 and/or the cookie viewer interface 120 can provide user access or control of information used in content distribution to the user. For example, the cookie viewer application 118 can be configured for generating a request for information associated with a user and/or can define an edit to the information. In some implementations, a user can download the cookie viewer application 118 and can install the application 118 on the computer device 102. In the present example, the application 118 can be delivered by a website associated with the content distribution system 104.

The application 118 can, for example, run on the device 102 and can pass the cookie 116 or information associated with the cookie 116 via the network 110 to the content distribution system 104. The content distribution system 104 can use the cookie 116 or an associated identifier to locate information in the information database 114 relating to a user of the device 102, for example. The information can include user interests, content display preferences, content provider preferences, and/or information relating to one or more content providers targeting a user, to name a few examples. The information or a subset of the information associated with a device user can, for example, be forwarded to the device 102 via the network 110. The information can be configured for use in selecting which content from providers to distribute to a user, for example. In the present example, information associated with a device user can be received by the computer device 102 and can be presented on a display device associated with the device 102.

In the present example, the cookie viewer application 118 can present the cookie viewer interface 120. For example, the cookie viewer interface 120 can include an information edit area generated on a display device associated with the computer device 102 for a user to specify an edit of information configured for use in selecting content from any of multiple content providers for a content distribution to the user. The edit in the present example can identify a content provider (such as a shoe company, for instance) and can include a modification of the content distribution regarding the content provider. For example, a user can choose to enable disable targeted advertising content from the shoe company. In the present example, the cookie viewer interface 120 can cause the edit of the information made by the user to be registered and to be stored in association with the information such that the modification is taken into account in the content distribution. Here, for example, the edit can be forwarded to the content distribution system 104 via the network 110 and stored by the system 104. Information associated with a particular user and edits made to the information by the user can be used by the content distribution system 104 to provide user control over which of the advertising content is included in the content distribution, for example whether general or targeted shoe company advertising content is to be presented to a particular user. In some implementations, other edits regarding content providers can be made. For example, the user can be able to explicitly select one or more content providers so that content from the selected provider(s) is received.

In some implementations, the information can identify one or more interests that have been associated with a user for selecting the content for content distribution. For example, it can be determined by methods such as the previously presented exemplary methods that a user has interests in the outdoors and in sports. The information can be presented by the cookie viewer interface 120, for example, and the user can be allowed to edit the information. In some implementations, a user can add or delete associated interests. Here, for example, a user can choose to deselect or disable an interest in sports and to select or enable an interest in gadgets, and the edit can be stored such that the modification is taken into account in the content distribution. For example, the content distribution system 104 can determine that content associated with selected interests (such as outdoors and gadgets) is to be presented to a user and that content associated with deselected interests (such as sports) is not to be presented. In some implementations, other edits regarding interests can be made. For example, the user can be able to explicitly select and/or enter one or more interests so that content regarding the selected interest(s) is delivered to the user.

In some implementations, a user can add or delete content providers. For example, a user can specify a preference to receive content from one electronics store, but not to receive content from another electronics store. In some implementations, a content provider can be referred to as anonymous. For example, an advertiser that delivers targeted advertising can express a preference to not identify itself. In the present example, advertisers choosing anonymity can be referred to as anonymous in the cookie viewer interface 120. Here, for example, a user can specify a preference to not receive targeted advertisements from anonymous content providers.

In some implementations, the edit to the information can include a user-defined modification. For example, a user can have an interest in an interest category such as home recording. In the present example, a free-form entry control can be provided via the cookie viewer interface 120 to allow for such additions. An edit including a user-defined modification of content distribution regarding an interest can be stored such that the user-defined modification is taken into account in the content distribution, for example.

In some implementations, a content provider can retarget a user in response to the user accessing content associated with the content provider. For example, a user can register with a website operated by a shoe company and be subsequently provided with retargeted advertising content, such as personalized advertisements, when the user visits the same and/or another page, for example. Here, for example, via the cookie viewer application 118 and the cookie viewer interface 120, one or more content providers (e.g. the shoe company) can be identified as having retargeted the user. In the present example, the user can specify that the content provider (e.g. the shoe company) is to be blocked from retargeting the user but that the content provider can provide content to the user based on prior modifications.

In some implementations, a user can specify a preference regarding the content distribution. A user can specify a preference for one or more attributes for content distribution, such as text, graphics, video, animation, sound, or interactivity, to name a few examples. Here, for example, via the cookie viewer application 118 and/or the cookie viewer interface 120, a user can specify a preference for content including video and sound. In the present example, the edit can be stored such that the user preference specification is taken into account in the content distribution.

Figure 2:
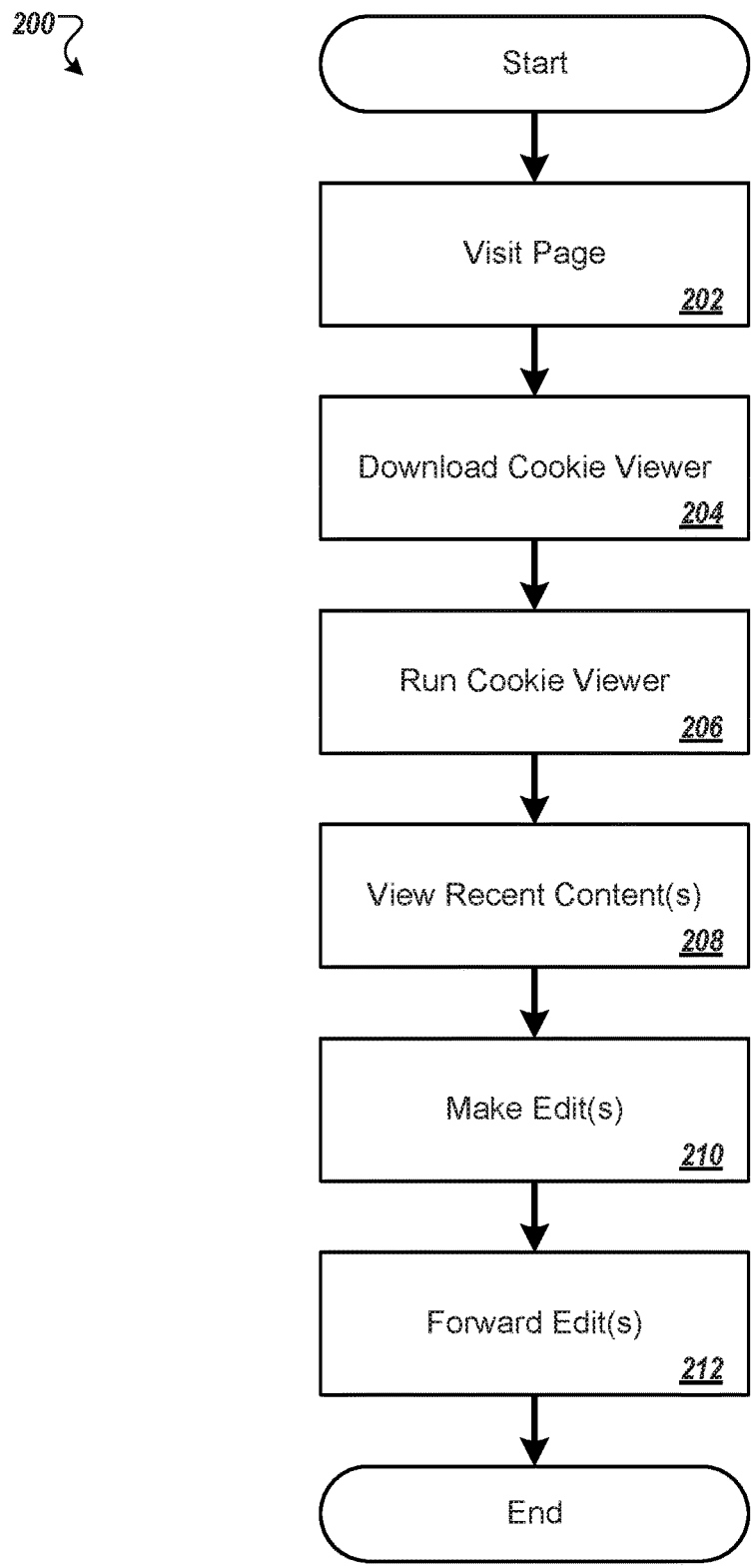
FIG. 2 shows an example of a process for controlling content distribution.

In some implementations, a predetermined number of content portions can be identified as having been most recently presented to a user in the content distribution. For example, the content distribution system 104 or the cookie viewer application 118 can track the ten most recent advertisements that were presented to a user. In the present example, a graphical user interface associated with the cookie viewer application 118 can cause at least part of each of the ten advertising content portions to be again presented on the device, such as in the interface 120. Here, the application 118 can receive an input generated by the user identifying at least one of the advertising content portions and can include an edit of the information regarding the portion(s). For example, a user can specify a preference that one or more advertisements are, or are not, to be subsequently displayed. In the present example, the edit can be stored such that one or more of the identified content portions is to be blocked from being presented on the device. FIG. 2 shows an example of a process 200 for controlling content distribution. In some implementations, the process 200 can be performed in the system 100, for example by a processor executing instructions from a computer readable storage device. More or fewer steps can be performed; as another example, one or more steps can be performed in another order.

The process 200 can, for example, be initiated by a user accessing content such as a web page on the Internet by using a computer device such as a desktop or portable computer, a server, or a cell phone, to name a few examples. In the present example, the process 200 can include a step 202 for visiting a web page. Here, for example, the web page can be associated with a content publisher in the system 100. In other implementations, the web page can be associated with another entity in the system 100, such as a content provider or content distributor.

The process 200 can include a step 204 for downloading a cookie viewer. In some implementations, the cookie viewer can be downloaded from a web page, such as a web page visited in step 202, or a web page associated with the content distribution system 104, for example. Here, for example, step 204 can include receiving at the device instructions for execution. In the present example, the executable instructions can be configured for generating a cookie viewer application on the device. The cookie viewer can be a stand-alone application, or an application running within a web browser, to name a couple of examples.

The process 200 can include a step 206 for running a cookie viewer. For example, the cookie viewer can be a cookie viewer downloaded in step 204. In some implementations, step 206 can include executing instructions that can generate on a display device a graphical user interface. The interface can, for example, allow a user to view and/or edit information associated with an Internet cookie stored on a computer device.

The process 200 can include a step 208 for viewing recent content(s). For example, the content(s) can be presented to the user by an application such as a cookie viewer run in step 206. In some implementations, a predetermined number of content portions can be identified as having been most recently presented to the user. For example, ten advertisements or portions of the ten advertisements most recently presented to a user (by a web browser, for example) can again be presented on the device. In the present example, the contents can be retrieved by a computer device forwarding a cookie or information associated with a cookie to a server that can track content (e.g. advertising) previously sent to a particular device. Here, content or portions thereof can be retrieved, for example from a database, and resent to a requesting device. In some implementations, content or portions of content can be cached on the computer device itself.

The process 200 can include a step 210 where the user makes one or more edits. In some implementations, the edit can permit the user to exercise control over advertising content to be included in the content distribution. For example, the edit(s) can be made relating to recently presented content viewed in step 208. In the present example, a user can identify one or more of the ten content portions (e.g. advertisements) most recently presented to the user and specify that the identified content portion(s) are to be blocked from being presented on the device. In some implementations, a user can identify one or more content portions and can express a positive or negative preference for the identified content portions. In some implementations, a user can identify one or more content providers and can express a positive or negative preference for the identified content providers.

The process 200 can include a step 212 for forwarding one or more edits. For example, the forwarded edit(s) can be the edit(s) made in step 210. In the present example, the edit(s) can be forwarded to a server storing preference information, for example, a server associated with the system 100. Here, for example, edit(s) signifying a blocking preference can be used by the system 100 to prevent presentation of one or more content portions. For example, the presentation of a content portion (e.g. an advertisement) to a user can be prevented upon receiving edit(s) from the user specifying a preference for blocking the content portion. Blocking can be performed by one or more servers associated with the system 100 or by a device operated by a user, for example. In some implementations, edit(s) signifying positive or negative content preference data associated with a user or a set of users of the system 100 can be used to determine a frequency and/or schedule for the presentation of one or more content portions. For example, a user can specify a preference for a specific content portion. The specified preference can be used by the system 100, for example to increase the frequency of display of the content portion and/or related content portions to the user and/or related users. For example, a content portion associated with a positive user preference can be presented more frequently to another user or another set of users determined to be similar, such as users having similar interests.

In some implementations, a user can opt out of some or all targeted advertising through use of an optional persistent opt-out cookie that is managed through a browser plug-in. The opt-out cookie may be, for example, a client-side cookie with a non-tracking id such as id=OPT_OUT. For example, an opt-out browser plug-in can monitor the existence of the opt-out cookie, and can reset the opt-out cookie in case it is removed. The opt-out plug-in can take the form of, for example, a browser extension or browser ad-on. Once installed, the plug-in automatically opts-out of targeted advertisements, or, in some implementations, adds an opt-out menu item to the browser tools menu or other browser user interface providing the capability to opt-out of targeted advertising cookies.

When enabled, the extension or add-on can respond to events such as, for example, the completed rendering of a web-page, the manually deletion of a cookie through the browser's functions, or cookie modification through third party software. Either immediately upon these events or after a timeout period, such as, for example, a configurable timeout period set to 10 minutes by default, the extension can programmatically restore the opt-out cookie if it no longer exists. If the browser settings are inconsistent with the opt-out plug-in, such as, for example, when the browser is configured to "block 3rd party cookies", the extension can be grayed out and an alert to the user, through a bubble, tool-tip, or the like may be presented. Such an opt-out browser plug-in may be configured as part of the preferences tool to, for example, respect selections made by the user and/or opt-out of certain types of advertisements.

Figure 3:
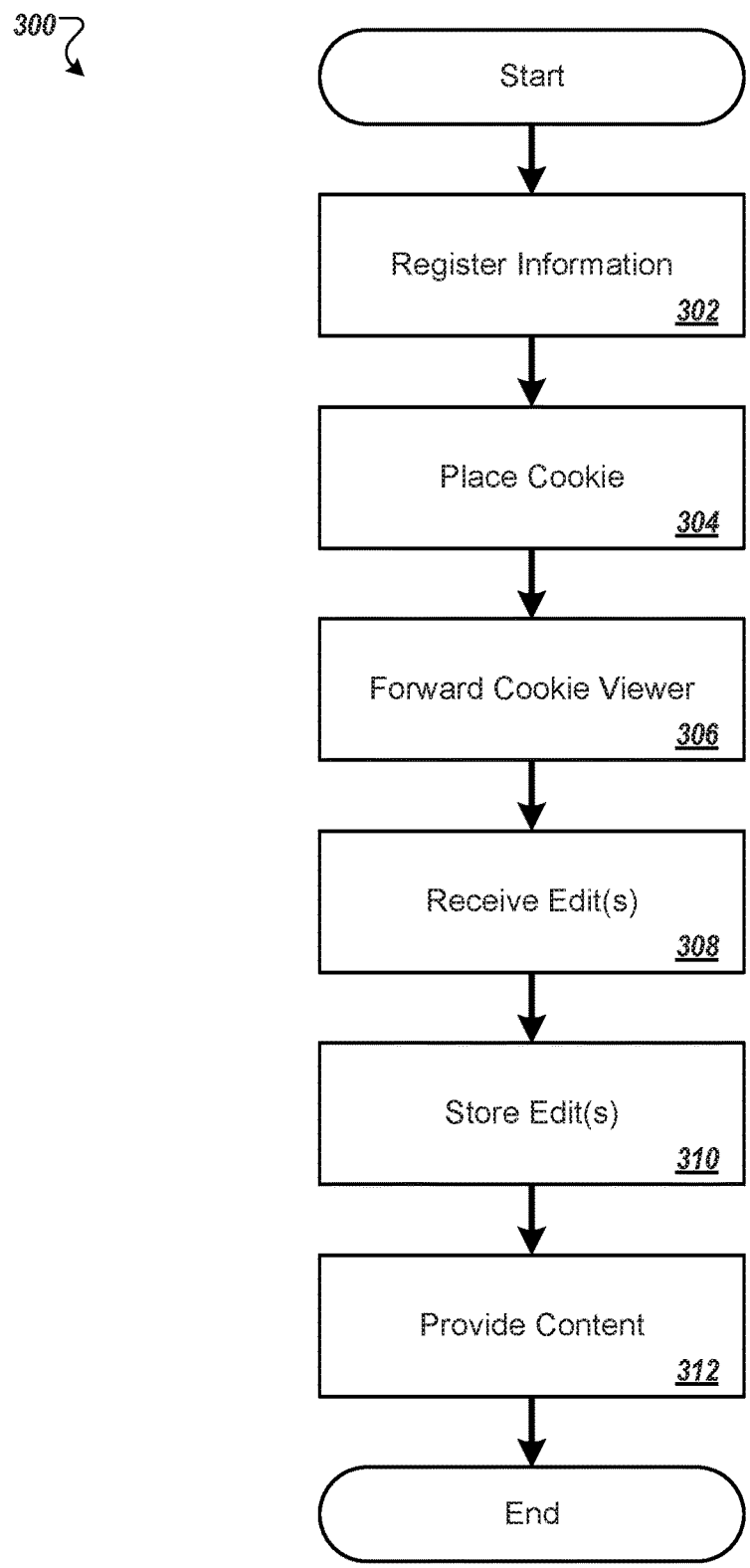
FIG. 3 shows an example of a process for providing content.

FIG. 3 shows an example of a process 300 for providing content. In some implementations, the process 300 can be performed in the system 100, for example by a processor executing instructions from a computer readable storage device. Here, for example, the instructions when executed by a processor can perform a method for controlling content distribution. More or fewer steps can be performed; as another example, one or more steps can be performed in another order.

The process 300 can, for example, be initiated by a server accessed by a device over a network such as a desktop or portable computer, a cell phone, or another server, to name a few examples. In the present example, the process 300 can include a step 302 for registering information. Here, for example, registering of information can be performed by a server in the system 100, such as a server associated with a content distributor, a content provider, or a content publisher. The information can be associated with a device such as a computer device in the system 100 and/or a user controlling a device, for example. In the present example, a device can provide information to a server upon accessing a web page associated with the server. Here, for example, information can include, but is not limited to information such as user name(s), password(s), preferences, and/or device-related information.

The process 300 can include a step 304 for placing a cookie. For example, a cookie can be placed on a computer device by a server upon registering device information, such as in step 302. In some implementations, a server registering information associated with a user and/or a device can place a cookie including a user and/or a device identifier. For example, identifier(s) can be unique ID(s) generated by a server associated with the system 100. In the present example, one or more identifiers can be stored in a database associated with the server with information related to one or more users and/or one or more devices. Information related to user(s) and/or device(s) can be stored and retrieved by using associated identifier(s).

The process 300 can include a step 306 for forwarding a cookie viewer application. For example, a cookie viewer can be forwarded to a computer device having a placed cookie, such as a cookie placed in step 304. In the present example, a cookie viewer can be forwarded to a device by a server associated with the system 100. In some implementations, a cookie viewer can include executable instructions for execution on a device configured for a user to view information and/or to define an edit to information associated with a user and/or device.

The process 300 can include a step 308 for receiving one or more edits. In some implementations, edit(s) can be performed by a user operating a computer device such as a device running a cookie viewer downloaded in step 306, for example. Here, for example, information can be forwarded to the device in response to receiving a request for information from the device. Information can be forwarded by a server associated with the system 100, for presentation on the device, for example. In the present example, information can include, but is not limited to information such as content preference(s) relating to provider, interest, presentation, and/or format. Here, for example, a server can receive one or more edits to the information made by a user operating an interface associated with a cookie viewer.

The process 300 can include a step 310 for storing one or more edits. For example, the edit(s) can be edit(s) received in step 308. In some implementations, edit(s) can be associated with one or more identifiers, such as user and/or device identifiers, for example. In the present example, identifier(s) can be included in a cookie placed on a computer device in step 304. The cookie or identifier(s) included in the cookie can be used by a server for storing related edit(s) in a database, for example.

The process 300 can include a step 312 for providing content. For example, content can be provided by a server associated with the system 100 to a computer device associated with the system 100. In some implementations, a method for determining the content that can be provided to a device can take into account information associated with a user and/or a device as well as edit(s) to the information, such as edit(s) stored in step 310, for example. In the present example, provided content can include text, video, animation, sound, and/or interactive elements, to name a few possibilities. Here, for example, content can be associated with one or more providers, interests, presentation styles and formatting types. In some implementations, a determination of content to be provided to a user and/or a device can be based at least in part on stored information and/or edit(s) associated with the user and/or the device. For example, a server such as a server in the system 100 can compare the content with the information and/or edit(s) and can determine whether characteristics of the content match preferences expressed in the information and/or edit(s). In some implementations, a server can take into account one or more preferences expressed in the information and/or edit(s) associated with a set of users and/or devices related to a user and/or device when determining which content to provide. For example, a user can be identified as having a positive or negative interest in sports by considering information and/or edit(s) associated with the user. Here, for example, a server can provide content preferred by one or more other users with a similar interest in sports.

In some implementations, provided content can include advertising content for presentation in a web browser, for example. In some implementations, provided content can include entertainment and/or information content, such as music, video, animation, news, and/or gaming content, to name a few examples. The content can be presented by a web browser or a non-browser application running on a computer device, for example. In some implementations, content can be presented on a device in communication with the computer device, such as peripheral video and/or sound devices, or another computer device, to name a few examples.

Figure 4:
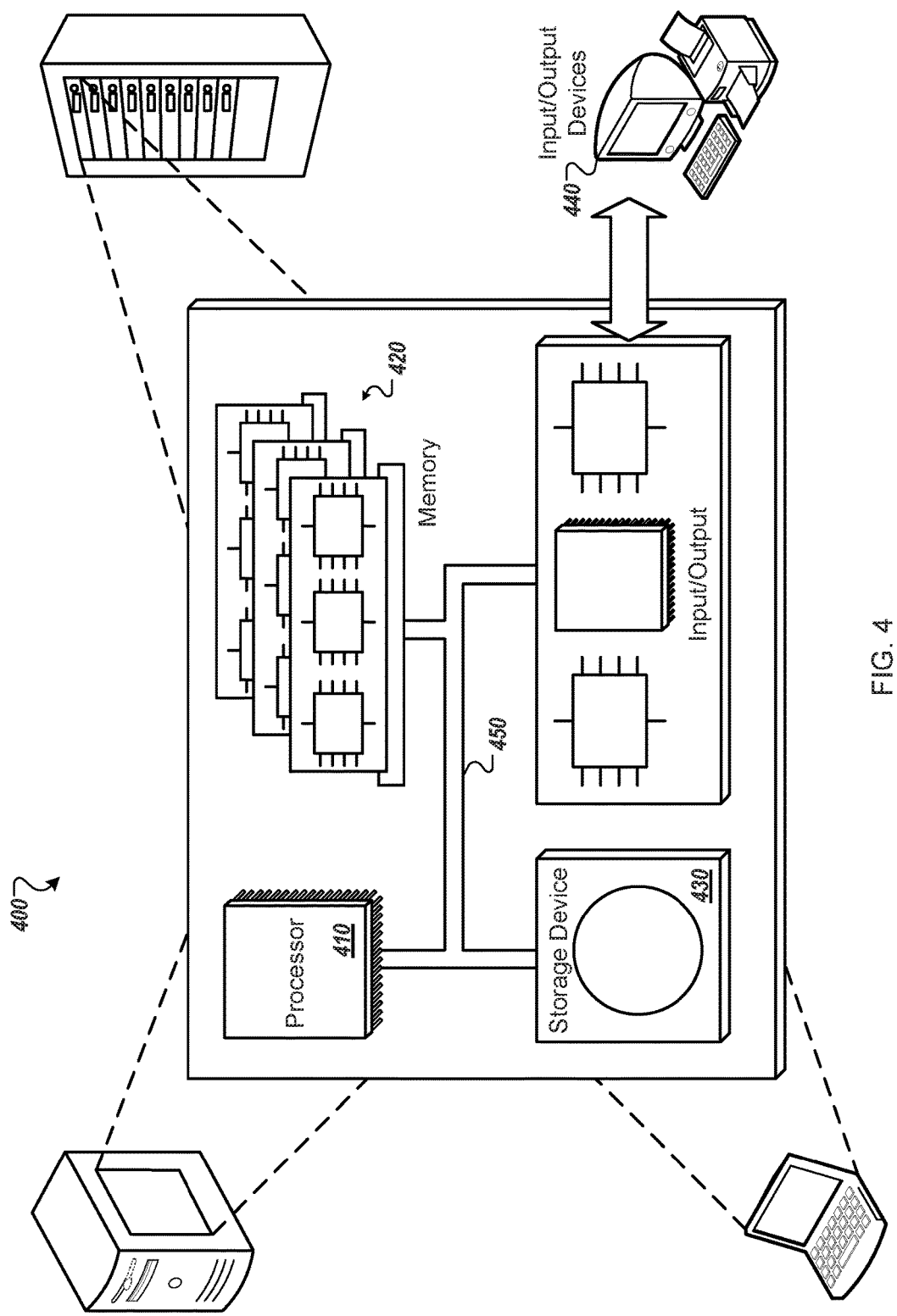
FIG. 4 is a block diagram of a computing system that can be used in connection with computer-implemented methods described in this document.

FIG. 4 is a schematic diagram of a generic computer system 400. The system 400 can be used for the operations described in association with any of the computer-implement methods described previously, according to one implementation. The system 400 includes a processor 410, a memory 420, a storage device 430, and an input/output device 440. Each of the components 410, 420, 430, and 440 are interconnected using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430 to display graphical information for a user interface on the input/output device 440.

The memory 420 stores information within the system 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the system 400. In one implementation, the storage device 430 is a computer-readable medium. In various different implementations, the storage device 430 may be a floppy disk device, a hard disk device, an optical disk device, or a tape device.

The input/output device 440 provides input/output operations for the system 400. In one implementation, the input/output device 440 includes a keyboard and/or pointing device. In another implementation, the input/output device 440 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made without departing from the spirit and scope of this disclosure. Accordingly, other implementations are within the scope of the following claims.

What is claimed is:

1. A computer-implemented method for controlling content distribution, the method comprising:
    identifying, for a user, interests used to select content that is distributed to the user;
    providing, for display in a graphical user interface, content distribution information that includes one or more of the identified interests that are used to select content that is distributed to the user;
    receiving, from a device associated with the user, an edit of the content distribution information, wherein the edit comprises a first modification that updates a viewing preference of the user for viewing content related to a first interest;
    storing the edit in the content distribution information;
    receiving a request from a first content provider to retarget the user, wherein the user previously accessed content provided by the first content provider; and
    based on receiving the request to retarget the user and based on the updated viewing preference:
        identifying a content portion that was previously presented to the user and is related to the first interest and is provided by the first content provider; and
        causing the identified content portion to be presented to the user again.

2. The computer-implemented method of claim 1, wherein the content distribution takes place under an arrangement where the content providers provide advertising content for publication in connection with content from any of a plurality of publishers, wherein the plurality of publishers receive compensation from the content providers in return for publication, and wherein the edit permits the user to exercise control over which of the advertising content is included in the content distribution.

3. The computer-implemented method of claim 1, wherein receiving the edit comprises receiving a user input via a free-form entry control.

4. The computer-implemented method of claim 1, wherein the edit further comprises a preference for one or more attributes for content distribution, wherein the preference is taken into account when identifying the content portion.

5. The computer-implemented method of claim 1, wherein receiving a request from a first content provider to retarget the user comprises determining that the first content provider previously provided content for presentation to the user.

6. The computer-implemented method of claim 1, further comprising identifying a predetermined number of content portions as having been most recently presented to the user, wherein the first content provider provided at least one of the content portions identified as having been most recently presented to the user.

7. The computer-implemented method of claim 6, wherein the first modification indicates a positive preference for the first interest.

8. A computer program product embodied in a computer readable storage device and comprising instructions that when executed by one or more processors perform a method for controlling content distribution, the method comprising:
    identifying, for a user, interests used to select content that is distributed to the user;
    providing, for display in a graphical user interface, content distribution information that includes one or more of the identified interests that are used to select content that is distributed to the user;
    receiving, from a device associated with the user, an edit of the content distribution information, wherein the edit comprises a first modification that updates a viewing preference of the user for viewing content related to a first interest;
    storing the edit in the content distribution information;
    receiving a request from a first content provider to retarget the user, wherein the user previously accessed content provided by the first content provider; and
    based on receiving the request to retarget the user and based on the updated viewing preference:
        identifying a content portion that was previously presented to the user and is related to the first interest and is provided by the first content provider; and
        causing the identified content portion to be presented to the user again.

9. The computer program product of claim 8, wherein the content distribution takes place under an arrangement where the content providers provide advertising content for publication in connection with content from any of a plurality of publishers, wherein the plurality of publishers receive compensation from the content providers in return for publication, and wherein the edit permits the user to exercise control over which of the advertising content is included in the content distribution.

10. The computer program product of claim 8, wherein the edit further comprises a preference for one or more attributes for content distribution,
    wherein the preference is taken into account when identifying the content portion.

11. The computer program product of claim 8, wherein receiving a request from a first content provider to retarget the user comprises determining that the first content provider previously provided content for presentation to the user.

12. The computer program product of claim 8, the method further comprising identifying a predetermined number of content portions as having been most recently presented to the user,
    wherein the first content provider provided at least one of the content portions identified as having been most recently presented to the user.

13. The computer program product of claim 12, wherein the first modification indicates a positive preference for the first interest.

* * * * *